(No Model.)

E. J. LELAND.
GALVANIC BATTERY.

No. 352,877.      Patented Nov. 16, 1886.

WITNESSES.
Chas A. Messinger
L. M. S. Stebbins

INVENTOR.
Edwin J. Leland
By Rufus Bennett Fowler
atty.

UNITED STATES PATENT OFFICE.

EDWIN J. LELAND, OF WORCESTER, MASSACHUSETTS.

GALVANIC BATTERY.

SPECIFICATION forming part of Letters Patent No. 352,877, dated November 16, 1886.

Application filed August 24, 1885. Serial No. 175,170. (No model.)

*To all whom it may concern:*

Be it known that I, EDWIN J. LELAND, a citizen of the United States, residing at Worcester, in the county of Worcester and State of Massachusetts, have invented a new and useful Improvement in Galvanic Batteries, of which the following is a specification, accompanied by drawings showing a battery embodying the features of my invention, and in which—

Figure 1:
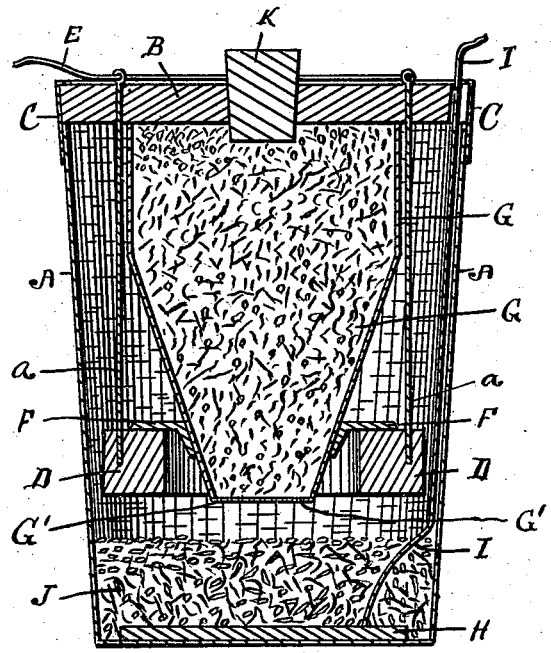
Figure 2:
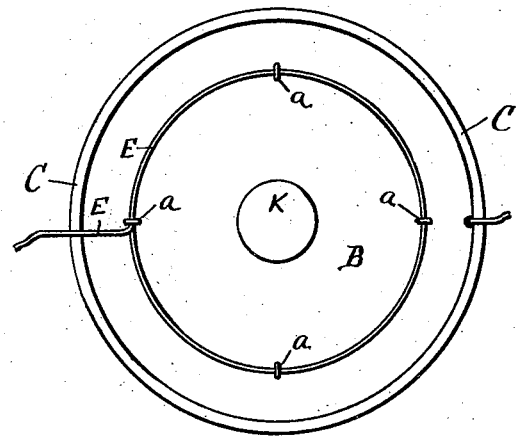

Figure 1 shows a vertical sectional view, and Fig. 2 is a top view.

Similar letters indicate like parts in the several views.

A A denotes a glass jar, and B a wooden cover accurately fitting the top of the jar and held in place by an endless elastic band, C, passing around the top of the glass jar and overlapping the edges of the cover B. From the cover B a zinc ring, D, is suspended by the rods $a$, which are attached at their lower ends to the zinc ring, and have their upper ends passing through the cover B and connected by the wire E. Upon the zinc ring D, I place insulating-strips F of some non-conducting material separating the zinc ring and the reservoir G, which is suspended by the zinc ring D and held against the cover B. The reservoir G is a hopper-shaped receptacle, preferably of iron, whose lower end, G', is closed by a wire-gauze, which is brought into the same horizontal plane as the under side of the zinc ring D.

Upon the bottom of the jar I place a disk of sheet-iron, H, covered with a layer of chips or scales of oxide of copper, J, and having a connected wire, I, passing up outside the zinc ring D and through an opening in the edge of the wooden cover B.

In charging the battery I place the iron disk in position on the bottom of the jar, covering it with the oxide of copper. The cover B, with its connected zinc ring and suspended reservoir G, is then placed over the top of the jar and secured by the elastic band C. The reservoir is filled with potash through an opening in the center of the cover, and the entire jar is then filled with a saturated solution of potash, and the central opening in the cover closed by the cork K.

So long as the circuit remains open the battery is inert; but whenever the wires I and E are connected and the circuit completed chemical action ensues, the solution of potash attacking the zinc ring D, generating a current of electricity, which is conducted through the iron disk H to the positive pole, the depolarization of the iron element being secured by the conversion of the oxide-of-copper chips J into metallic copper. During the period of chemical action the solution of potash is kept at the point of saturation by the gradual dissolution of the potash held in the reservoir G. Thus the conditions of uniform and constant action is maintained until the oxide of copper J is converted into metallic copper or the zinc ring D is entirely destroyed.

What I claim as of my invention, and desire to secure by Letters Patent, is—

1. An electric battery consisting of a hermetically-covered jar containing an exciting-fluid, a ring-shaped positive electrode suspended midway in said fluid, a closed hopper-shaped reservoir containing the crystals of the exciting-salt suspended from the cover of the jar and immersed in the exciting-fluid, the lower or small end of said reservoir being permeable and placed within the positive electrode, and a negative electrode placed in the bottom of the jar and surrounded by suitable depolarizing material, as described, and for the purpose set forth.

2. The combination, in a jar containing an exciting-fluid, of a zinc ring, D, reservoir containing crystals of the exciting-salt for the positive electrode, iron disk H, and oxide of copper J, as described, and for the purpose set forth.

3. The combination, with a jar containing exciting-fluid and positive and negative electrodes, of a hopper-shaped reservoir suspended from the cover of the jar, a cover placed hermetically on said jar and having an opening to admit the crystals of the exciting-salt to be placed in the reservoir, and a depolarizing material around the negative electrode, substantially as described, and for the purpose set forth.

EDWIN J. LELAND.

Witnesses:
RUFUS B. FOWLER,
M. P. BULLARD.